US008304569B2

(12) United States Patent
Cremer

(10) Patent No.: US 8,304,569 B2
(45) Date of Patent: Nov. 6, 2012

(54) METHOD FOR PRODUCING ISOCYANATE-TERMINATED SILOXANES

(75) Inventor: Jens Cremer, Munich (DE)

(73) Assignee: Wacker Chemie AG, Munich (DE)

( * ) Notice: Subject to any disclaimer, the term of this patent is extended or adjusted under 35 U.S.C. 154(b) by 307 days.

(21) Appl. No.: 12/812,161

(22) PCT Filed: Jan. 16, 2009

(86) PCT No.: PCT/EP2009/050458
§ 371 (c)(1),
(2), (4) Date: Jul. 8, 2010

(87) PCT Pub. No.: WO2009/092665
PCT Pub. Date: Jul. 30, 2009

(65) Prior Publication Data
US 2010/0286426 A1    Nov. 11, 2010

(30) Foreign Application Priority Data
Jan. 23, 2008   (DE) .......................... 10 2008 000 140

(51) Int. Cl.
*C08G 77/388* (2006.01)
(52) U.S. Cl. ....................................................... 556/414
(58) Field of Classification Search .................. None
See application file for complete search history.

(56) References Cited

U.S. PATENT DOCUMENTS

| 3,170,891 A | 2/1965 | Speier |
| 3,179,622 A | 4/1965 | Haluska |
| 5,886,205 A | 3/1999 | Uchida et al. |
| 2004/0181025 A1 | 9/2004 | Schindler et al. |
| 2004/0204539 A1 | 10/2004 | Schindler et al. |

FOREIGN PATENT DOCUMENTS

| DE | 102005032948 A1 | 1/2007 |
| EP | 1780213 A1 | 5/2007 |
| JP | 05005713 | 1/1993 |
| JP | 2001048855 A | 2/2001 |
| WO | 03014226 A1 | 2/2003 |
| WO | 03018658 A1 | 3/2003 |

OTHER PUBLICATIONS

Stefan Altmann and Jurgen Pfeiffer, "The Hydrolysis / Condensation Behaviour of Methacryloyloxyalkylfunctional Alkoxysilanes: Structure-Reactivity Relations", Monatshefte fur Chemie 134, 1081-1092 (2003).

*Primary Examiner* — Yevegeny Valenrod
(74) *Attorney, Agent, or Firm* — Brooks Kushman P.C.

(57) ABSTRACT

Isocyanate-functional or protected isocyanate-functional organopolysiloxanes are prepared directly by reaction of a siloxane bearing at least one silicon-bonded hydroxyl group with an alkoxy-functional α-silane containing an isocyanate group or blocked isocyanate group.

8 Claims, No Drawings

METHOD FOR PRODUCING ISOCYANATE-TERMINATED SILOXANES

CROSS-REFERENCE TO RELATED APPLICATION

This application is the U.S. national phase of PCT/EP2009/050458 filed Jan. 16, 2009 which claims priority to German application DE 10 2008 000 140.6 filed Jan. 23, 2008.

BACKGROUND OF THE INVENTION

1. Field of the Invention

The invention relates to a process for preparing isocyanate-terminated siloxanes.

2. Description of the Related Art

Isocyanate-terminated siloxanes are valuable starting materials since they combine the properties of siloxanes with the high reactivity of isocyanates and are thus suitable for producing silicone-containing polyurethanes or polyureas.

The current state of the art describes a variety of methods of preparing isocyanate-terminated siloxanes, as indicated in the following references:

U.S. Pat. No. 3,170,891 describes the preparation of isocyanate-terminated siloxanes by hydrosilylation of unsaturated isocyanates by means of Si—H-terminated siloxanes. However, a disadvantage is the high raw materials costs resulting from the use of the Si—H-siloxanes and also the platinum catalyst required. In addition, the reaction is not quantitative and is characterized by the formation of numerous by-products.

U.S. Pat. No. 3,179,622 describes the synthesis of amine- or carbinol-functionalized siloxanes and diisocyanates. However, the isocyanate-terminated siloxanes obtained in this way are not completely free of the toxic monomeric diisocyanates. In addition, these siloxanes also have urea or urethane units in the chain and these have an adverse effect on the viscosity and storage stability of these materials.

U.S. Pat. No. 5,886,205 describes the preparation of isocyanate-terminated siloxanes by pyrolysis of urethane-siloxanes which have been obtained by reaction of amine-functionalized siloxanes with diorgano carbonates. Owing to the relatively drastic reaction conditions, this synthesis leads to a series of by-products. JP 2001-48855 is concerned with this synthesis in modified form. Although the use of diaryl carbonates results in high yields of isocyanate-terminated siloxanes, the reaction times are very long and high molecular weight siloxanes can be obtained only with great difficulty by this method.

JP 2001-48855 is concerned with this synthesis in modified form. Although the use of diaryl carbonates results in high yields of isocyanate-terminated siloxanes, the reaction times are very long and high molecular weight siloxanes can be obtained only with great difficulty by this method.

A direct synthesis of the isocyanate-terminated siloxanes by means of phosgenation of corresponding amine-functionalized siloxanes is not possible because of the HCl liberated in the reaction. According to U.S. Pat. No. 5,886,205, this strong acid leads to degradation of the siloxane chain during the reaction. Scavenging of the HCl by means of tertiary amines as bases, as is described in the Japanese publication 5-5713 (1993), is not practicable on an industrial scale.

EP 1780213 describes a two-stage process for preparing isocyanate-terminated siloxanes, in which amine-functionalized siloxanes are firstly reacted with carbonyl bisazolides to form siloxane-urea azolides. These are then pyrolyzed thermally to the corresponding isocyanate-terminated siloxanes. A disadvantage is the two-stage process which also requires expensive raw materials.

SUMMARY OF THE INVENTION

It was therefore an object of the invention to develop a process which provides a fast and inexpensive route to isocyanate-terminated siloxanes. These and other objects are achieved by reaction of a siloxane bearing at least one silicon-bonded hydroxyl group with an alkoxy-functional a-silane bearing an isocyanate group or protected isocyanate group.

DETAILED DESCRIPTION OF THE PREFERRED EMBODIMENTS

In WO 03/18658 and WO 03/14226, functionalized alkoxysilanes in which the alkoxysilyl group is separated by a methylene spacer from a heteroatom, e.g. oxygen or nitrogen, and the reactivity of the silanes with respect to hydrolysis and condensation of the silyl unit is considerably increased by the spatial proximity of these two groups are used for functionalizing organopolysiloxanes and organic polymers. The increased reactivity of such "α-silanes" having a methylene spacer is also described in Monatsh. Chem. 2003, 134, 1081-1092.

Such highly reactive α-silanes have hitherto been used for preparing silane-functional (pre)polymers which have a correspondingly increased reactivity toward moisture and are thus suitable for producing compositions which cure in the presence of atmospheric moisture.

The invention provides a process for preparing isocyanate-terminated siloxanes by reaction of Si—OH-terminated, branched or unbranched siloxanes (A) containing units of the formula (I):

$$R_a R^1_b (R^2 O)_c SiO_{4-a-b-c/2} \qquad (I)$$

where

R is a monovalent, SiC-bonded, substituted or unsubstituted hydrocarbon radical which may be interrupted by oxygen atoms, $R^1$ is an Si-bonded hydroxyl group, the radicals $R^2$ can be identical or different and are each a monovalent, substituted or unsubstituted hydrocarbon radical which may be interrupted by heteroatoms, a is 0, 1, 2 or 3, b is 0, 1, 2 or 3 and c is 0, 1, 2 or 3, with the proviso that the sum a+b+c≦3 and at least one unit having b different from 0 is present, with reactive, optionally protected isocyanate-comprising α-silanes

$$(R^2O)_n R^1_m Si—CH_2—NR^3 \qquad (II),$$

where $R^1$ and $R^2$ are as defined above, $R^3$ is CO or H—CO—Z, where Z is a monovalent, substituted or unsubstituted hydrocarbon radical which may be interrupted by heteroatoms, n is 1, 2 or 3 and m is 0, 1 or 2, with the proviso that the sum m+n=3.

For the purposes of the present invention, the term siloxanes encompasses polymeric, oligomeric and dimeric siloxanes.

In the process of the invention, Si—OH-terminated, branched or unbranched siloxanes (A) containing units of the formula (I):

$$R_a R^1{}_b (R^2O)_c SiO_{4-a-b-c/2} \tag{I}$$

where

R is a monovalent, SiC-bonded, substituted or unsubstituted hydrocarbon radical which may be interrupted by oxygen atoms, $R^1$ is an Si-bonded hydroxyl group, the radicals $R^2$ can be identical or different and are each a monovalent, substituted or unsubstituted hydrocarbon radical which may be interrupted by heteroatoms, a is 0, 1, 2 or 3, b is 1, 2 or 3 and c is 0, 1, 2 or 3, with the proviso that the sum $a+b+c \leq 3$ and at least one unit having b different from 0 is present, are used.

Examples of R are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n- hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl radical and the allyl radical; cycloalkyl radicals such as cyclopentyl, cyclohexyl, cycloheptyl and methylcyclohexyl radicals; aryl radicals such as the phenyl radical and the naphthyl radical; alkaryl radicals such as o-, m-, p-tolyl radicals, xylyl radicals and ethylphenyl radicals; and aralkyl radicals such as the benzyl radical, the α- and β-phenylethyl radicals.

Radicals R are preferably monovalent, substituted or unsubstituted hydrocarbon radicals having from 1 to 40 carbon atoms, particularly more preferably hydrocarbon radicals having from 1 to 30 carbon atoms, and in particular particular, hydrocarbon radicals having from 1 to 6 carbon atoms.

An example of an Si-bonded hydroxyl group $R^1$ is a silanol group.

Examples of substituted hydrocarbon radicals $R^2$ are methoxymethylene radicals, ethoxymethylene radicals, and dimethylaminomethylene and diethylaminomethylene radicals. Preference is given to a methoxymethylene radical.

Examples of Z are alkyl radicals such as the methyl, ethyl, n-propyl, isopropyl, n-butyl, isobutyl, tert-butyl, n-pentyl, isopentyl, neopentyl, tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl radical and the allyl radical; cycloalkyl radicals such as cyclopentyl, cyclohexyl, cycloheptyl radicals and methylcyclohexyl radicals; aryl radicals such as the phenyl radical and the naphthyl radical; alkaryl radicals such as o-, m-, p-tolyl radicals, xylyl radicals and ethylphenyl radicals; aralkyl radicals such as the benzyl radical, the α- and β-phenylethyl radicals. Preference is given to the methyl, ethyl, n-propyl, isopropyl, n-butyl, isobutyl, and tert-butyl radicals, and particular preference is given to the methyl radical.

Radicals $R^2$ are preferably monovalent, substituted or unsubstituted hydrocarbon radicals having from 1 to 40 carbon atoms, more preferably hydrocarbon radicals having from 1 to 30 carbon atoms, and in particular, hydrocarbon radicals having from 1 to 6 carbon atoms.

In the process of the invention, the siloxanes (A) are reacted with reactive α-silanes of the formula $$(R^2O)_n R^1{}_m Si-CH_2-NCO \tag{II},$$

where $R^1$ and $R^2$ are as defined above, n is 1, 2 or 3 and m is 0, 1 or 2, with the proviso that the sum m+n=3.

The reaction of the siloxanes (A) with the α-silanes of the formula (II) thus directly gives NCO-terminated siloxanes (B).

In the preferred embodiment of this process, methoxydimethyl(methylisocyanato)silane is used as the α-silane.

In a further embodiment of the process of the invention, the siloxanes (A) are reacted with reactive, protected α-silanes of the formula $$(R^2O)_n R^1{}_m Si-CH_2-NH-CO-Z \tag{III},$$

where $R^1$ and $R^2$ are as defined above, n is 1, 2 or 3 and m is 0, 1 or 2, with the proviso that the sum m+n=3, and Z is a monovalent, substituted or unsubstituted hydrocarbon radical which may be interrupted by heteroatoms.

The reaction with the protected α-silanes of the formula (III) gives protected, isocyanate-terminated siloxanes (B1). These siloxanes (B1) can subsequently be pyrolyzed at elevated temperature to the corresponding free NCO-terminated siloxanes (B) with liberation of the protective group.

The reaction of the siloxanes (A) with the α-silanes of the formula (II) is preferably carried out in the presence of a Brönsted acid. Examples of suitable acids are phosphoric acid, monoisopropylphosphate, dibutylphosphate, toluenesulfonic acid and methylsulfonic acid. Preference is given to using phosphoric acid. The process of the invention is preferably carried out in the presence of phosphoric acid.

The α-silanes are, based on the Si-bonded hydroxyl groups $R^1$ of the siloxanes (A), used in amounts of from 50 mol % to 200 mol %, preferably from 75 mol % to 150 mol %, and in particular, from 90 mol % to 120 mol %.

The acid is preferably added in amounts, based on the siloxane (A), of from 0.01 to 2% by weight, more preferably from 0.01 to 1.0% by weight, and most preferably from 0.01 to 0.5% by weight.

The reaction of the siloxanes (A) with the α-silanes is preferably carried out at temperatures of from −50° C. to 120° C., more preferably from −30° C. to 100° C., and most preferably from 0° C. to 60° C. The process of the invention is preferably carried out at room temperature.

The reaction of the siloxanes (A) with the α-silanes is accelerated by application of subatmospheric pressure. The reaction is preferably carried out at an applied vacuum of from 0.1 mbar to 1000 mbar, more preferably from 1 mbar to 500 mbar and most preferably from 10 mbar to 300 mbar. The process of the invention is preferably carried out at 250 mbar.

The process of the invention can be carried out in the presence of a solvent (S) which is inert toward isocyanates and alkoxysilanes. Examples of suitable solvents (S) are ethers, in particular aliphatic ethers such as dimethyl ether, diethyl ether, methyl t-butyl ether, diisopropyl ether, dioxane or tetrahydrofuran; esters, in particular aliphatic esters such as ethyl acetate or butyl acetate; ketones, in particular aliphatic ketones such as acetone or methyl ethyl ketone; amides such as DMF; aromatic hydrocarbons such as toluene or xylene; aliphatic hydrocarbons such as pentane, cyclopentane, hexane, cyclohexane, or heptanes; and chlorinated hydrocarbons such as methylene chloride or chloroform.

The solvent is added to the reaction mixture in an amount of from 0% by weight to 1000% by weight, more preferably from 0% by weight to 500% by weight, and in particular, from 0% by weight to 100% by weight, based on the siloxane (A). The process of the invention is preferably carried out in the absence of solvent.

The process of the invention has the advantage that isocyanate-terminated silicone oils can be obtained directly in a single-stage process. In addition, the process of the invention, has the advantage that inexpensive raw materials can be used.

In the following examples, all parts and percentages indicated are, unless indicated otherwise, by weight. Unless indicated otherwise, the following examples are carried out at the pressure of the surrounding atmosphere, i.e. at about 1000 mbar, and at room temperature, i.e. about 20° C. or a temperature which is established on combining the reactants at room temperature without additional heating or cooling. All viscosities indicated in the examples are based on a temperature of 25° C.

EXAMPLE 1

11.73 g (90.9 mmol) of isocyanatomethylmethoxydimethyl-silane and 100 mg of anhydrous phosphoric acid were placed under a protective gas atmosphere in a baked 100 ml round-bottom flask. 50.00 g of a linear siloxane of the formula HO—[(CH$_3$)$_2$—SiO]$_{14}$Si(CH$_3$)$_2$—OH were subsequently slowly added dropwise at room temperature and a reduced pressure of 250 mbar. After the reaction was complete, the reaction mixture was stirred for a further 30 minutes so that 58.8 g of the NCO-terminated siloxane could finally be obtained.

EXAMPLE 2

4.30 g (33.3 mmol) of isocyanatomethylmethoxydimethyl-silane and 100 mg of anhydrous phosphoric acid were placed under a protective gas atmosphere in a baked 100 ml round-bottom flask. 50.00 g of a linear siloxane of the formula HO—[(CH$_3$)$_2$—SiO]$_{39}$Si(CH$_3$)$_2$—OH were subsequently slowly added dropwise at room temperature and a reduced pressure of 250 mbar. After the reaction was complete, the reaction mixture was stirred for a further 30 minutes so that 53.2 g of the NCO-terminated siloxane could finally be obtained.

EXAMPLE 3

14.63 g (90.9 mmol) of methyl [(methoxydimethyl-silanyl)methyl]carbamate and 100 mg of anhydrous phosphoric acid were placed under a protective gas atmosphere in a baked 100 ml round-bottom flask. 50.00 g of a linear siloxane of the formula HO—[(CH$_3$)$_2$—SiO]$_{14}$Si(CH$_3$)$_2$—OH were subsequently slowly added dropwise at room temperature and a reduced pressure of 250 mbar. After the reaction was complete, the reaction mixture was stirred for a further 30 minutes so that 61.7 g of the methyl carbamate-protected siloxane could finally be obtained.

EXAMPLE 4

5.36 g (33.3 mmol) of methyl [(methoxydimethyl-silanyl)methyl]carbamate and 100 mg of anhydrous phosphoric acid were placed under a protective gas atmosphere in a baked 100 ml round-bottom flask. 50.00 g of a linear siloxane of the formula HO—[(CH$_3$)$_2$—SiO]$_{39}$Si(CH$_3$)$_2$—OH were subsequently slowly added dropwise at room temperature and a reduced pressure of 250 mbar. After the reaction was complete, the reaction mixture was stirred for a further 30 minutes so that 54.4 g of the methyl carbamate-protected siloxane could finally be obtained.

The invention claimed is:

1. A process for preparing isocyanate-terminated siloxanes comprising reacting at least one Si-OH-terminated, branched or unbranched siloxane (A) comprising units of the formula (I):

$$R_a R^1_b (R^2O)_c SiO_{4-a-b-c/2} \qquad (I),$$

where
R is a monovalent, SiC-bonded, substituted or unsubstituted hydrocarbon radical optionally interrupted by oxygen atoms,
R$^1$ is an Si-bonded hydroxyl group,
R$^2$ are identical or different and are each a monovalent, substituted or unsubstituted hydrocarbon radical optionally interrupted by heteroatoms,
a is 0, 1, 2 or 3,
b is 1, 2 or 3 and
c is 0, 1, 2 or 3,
with the proviso that the sum a+b+c≦3 and at least one unit having b different from 0 is present,
with at least one optionally protected isocyanate-functional α-silane of the formula:

$$(R^2O)_n R_m Si—CH_2—NR^3 \qquad (II),$$

where
R$^3$ is CO or H—CO—Z,
where Z is a monovalent, substituted or unsubstituted hydrocarbon radical optionally interrupted by heteroatoms,
n is 1, 2 or 3 and
m is 0, 1 or 2,
with the proviso that the sum m+n=3.

2. The process for preparing isocyanate-terminated siloxanes of claim 1, wherein methoxydimethyl(methylisocyanato)silane is used as an α-silane.

3. The process for preparing isocyanate-terminated siloxanes of claim 1, wherein the reaction of the siloxanes (A) with the α-silanes of the formula (II) is carried out in the presence of a Brönsted acid.

4. The process for preparing isocyanate-terminated siloxanes of claim 3, wherein the Brönsted acid is phosphoric acid, monoisopropylphosphate, dibutylphosphate, toluene-sulfonic acid, methylsulfonic acid or any mixture thereof.

5. The process for preparing isocyanate-terminated siloxanes of claim 3, wherein the Brönsted acid is used in an amount, based on the weight of siloxane (A), of from 0.01 to 1% by weight.

6. The process for preparing isocyanate-terminated siloxanes of claim 4, wherein the Brönsted acid is used in an amount, based on the weight of siloxane (A), of from 0.01 to 1% by weight.

7. The process for preparing isocyanate-terminated siloxanes of claim 1, wherein the reaction of the siloxanes (A) with the α-silanes is carried out at a temperature of from −20° C. to 100° C.

8. The process for preparing isocyanate-terminated siloxanes of claim 1, wherein the reaction of the siloxanes (A) with the α-silanes is carried out at an applied vacuum of from 0.1 mbar to 800 mbar.

* * * * *